United States Patent [19]
van der Winden

[11] 3,848,746
[45] Nov. 19, 1974

[54] APPARATUS FOR DIVERTING A ROW OF CYLINDRICAL BODIES ALTERNATELY INTO TWO PATHS OF TRAVEL

[75] Inventor: Johannes Bernardus van der Winden, Amstelveen, Netherlands

[73] Assignee: Stork Amsterdam B.V., Amstelveen, Netherlands

[22] Filed: Dec. 11, 1973

[21] Appl. No.: 423,822

Related U.S. Application Data

[63] Continuation-in-part of Ser. No. 259,178, June 2, 1972, abandoned, Continuation of Ser. No. 61,600, Aug. 6, 1970, abandoned.

[30] Foreign Application Priority Data
Aug. 8, 1969  Netherlands.................. 6912110

[52] U.S. Cl............................. 198/31 AC
[51] Int. Cl.............................. B65g 47/26
[58] Field of Search...... 198/31 AC, 31 AA, 31 AB, 198/31 R, 20 R

[56] References Cited
UNITED STATES PATENTS 2,566,417   9/1951   Holm.............................. 198/31 AC
2,833,391   5/1958   Wilcox............................ 198/31 AC
3,262,538   7/1966   Englander....................... 198/31 AC FOREIGN PATENTS OR APPLICATIONS
590,994   1/1960   Canada........................... 198/31 AC Primary Examiner—James B. Marbert
Assistant Examiner—James M. Slattery
Attorney, Agent, or Firm—Watson, Cole, Grindle & Watson

[57]  ABSTRACT

Apparatus for diverting a row of cylindrical bodies alternately into two divergent paths of travel includes a ridge element along which the bodies are advanced in an unstable condition, movable diverter means being located at the ridge element for thereafter diverting the bodies alternately into the two divergent paths along one of two divergent guide means as the bodies are thereby made to move to one side or the other of the ridge element and on to a movable conveyor located beneath the divergent guide means.

2 Claims, 4 Drawing Figures

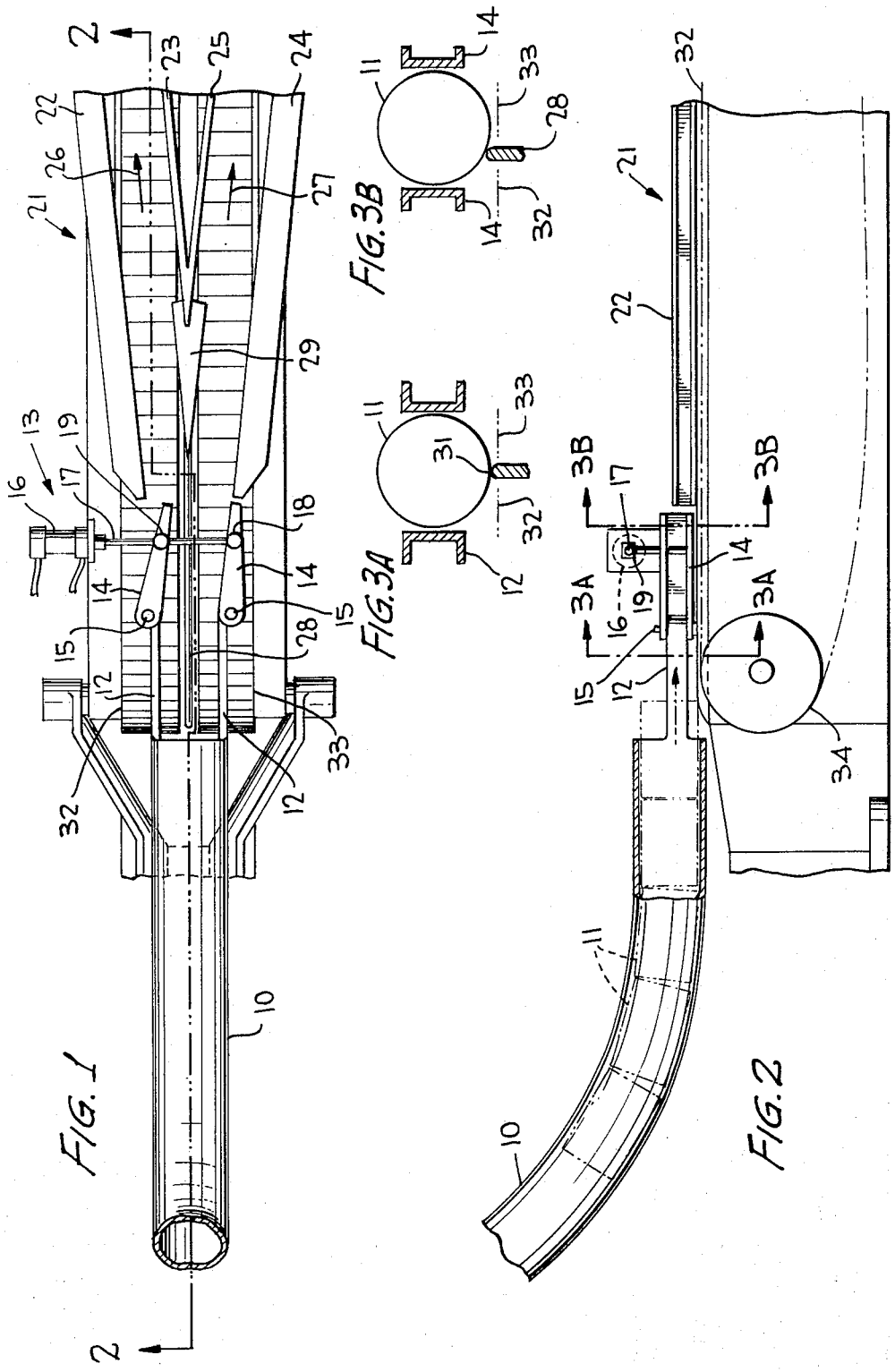

3,848,746

APPARATUS FOR DIVERTING A ROW OF CYLINDRICAL BODIES ALTERNATELY INTO TWO PATHS OF TRAVEL

DISCUSSION OF THE PRIOR ART

This application is a Continuation-In-Part of Ser. No. 259,178 filed June 2, 1972, now abandoned, as a continuation of Ser. No. 61,600 filed August 8, 1970, now abandoned. The present invention relates to an apparatus for separating or diverting a row of successively advancing cylindrical bodies from a path of travel alternately in two divergent paths of travel.

Known apparatus in this field are set forth in U.S. Pat. Nos. 2,289,943, 2,848,094 and 3,058,570. The capacity for each of these known apparatus is, however, relatively small. The number of cylindrical bodies which can therefore be processed at a given time is inadequate for the constantly increasing capacity of processing plants as in, for example, a continuous sterilizer.

There is consequently a need for an apparatus which can effectively divert the containers, successively advancing at a high speed along a path of travel, alternately into divergent paths of travel with such a rapid diversion that the operation of diverting from one path to another can be effected without an interruption of the high speed at which the containers are initially advanced.

BRIEF SUMMARY OF THE INVENTION

In accordance with the invention, a high capacity diverter apparatus is provided with the use of a narrow upright ridge element located centrally between a pair of spaced and fixed guide means disposed adjacent a means for initially advancing the bodies along a path of travel in an attitude lying on their respective outer cylindrical walls. The bodies therefore move along the ridge in an unstable condition after leaving the advancing means, and are thereafter diverted to one or the other sides of the ridge by a movable diverting means located at the ridge.

Since the bodies move along the ridge in a condition of labile equilibrium, both the energy and the displacement required for diverting the containers to one side of the ridge and the other is so small that change-over can be effected quite quickly, i.e., in a few hundredths of a second. During such time the diverting means may continue to act on the same cylindrical body. A shift of only a few millimeters is required for moving the bodies from one side to the other of the ridge element.

The foregoing and other objects and advantages of the present invention will become more apparent from the following detailed description of the invention when taken in conjunction with the accompanying drawings wherein:

BRIEF DESCRIPTION OF THE DRAWINGS

FIG. 1 is a top plan view of an embodiment of the apparatus according to the invention;

FIG. 2 is a side view of the apparatus shown in FIG. 1; and

FIGS. 3A and 3B are slightly enlarged cross-sectional views taken respectively along lines 3A—3A and 3B—3B of FIG. 2.

DETAILED DESCRIPTION OF THE INVENTION

An advancing means, such as a hollow tube, is used in conjunction with the present apparatus for advancing a row of cylindrical bodies 11 forwardly in an attitude lying on their respective outer cylindrical walls along the path of travel indicated by the arrow of FIG. 2. This hollow tube 10 slopes downwardly and forwardly, and has an inner diameter sufficiently large to accommodate cylindrical bodies 11. The tube effects a forced feed of a row of the cylindrical bodies along the path of travel, and is normally connected with an apparatus for changing the relative orientation of a row of successively advancing cylindrical bodies of the type disclosed in applicant's prior U.S. Pat. No. 3,197,013, dated July 27, 1965. Guide means in the form of a pair of spaced and parallel guide plates 12 are interconnected at their rearward ends to the forward open end of the tube. Diverter means 13 is disposed forwardly of guide plates 12, such diverter means including a pair of spaced guide plates 14 pivotally interconnected as at 15 to the respective plates 12. Guides 14 are slightly movable in a transverse direction by means of, for example, a pneumatic cylinder 16 which is operatively interconnected with a power source (not shown). Piston rod 17 extends outwardly of cylinder 16 and interconnects plates 14 as at 18 and 19 by means of short vertical rods shown in FIG. 2.

Fixed divergent guide means 21 are disposed forwardly of guide plates 14. These guide means include a first pair of spaced guide rails 22, 23 disposed at an angle to a pair of second guide rails 24, 25. These first and second guide rail pairs can be seen in FIG. 1 as forming an acute angle with one another, the first guide rails defining a path of travel 26 and the second guide rails defining a path of travel 27.

A narrow and elongated upright ridge element 28 is located centrally of guide plates 12 and parallel thereto, the ridge extending from a location adjacent the forward open end of tube 10 and terminating at a divider plate 29. This plate 29 is smoothly connected with the upper edge 31 of the ridge element and slopes slightly upwardly toward plate 23 and 25. Divider 29 likewise slopes downwardly from opposite sides of its longitudinal axis.

The apparatus of the invention further includes a pair of conveyor belts 32, 33 extending about rollers 34, only one such roller being shown in the drawings. One of these rollers is, of course, mounted for rotation by means of a suitable rotating means (not shown). Belts 32 and 33 are respectively located on opposite sides of ridge element 28, and are each at a level below upper edge 31 of the ridge element. Each conveyor belt likewise is disposed beneath the first and second divergent guide rail pairs 22, 23 and 24, 25. Moreover, belt 32 is shown in phantom outline in FIG. 2 in the interest of clarity.

In operation, the row of cylindrical bodies 11 are advanced forwardly by means of hollow tube 10 in an attitude lying on their respective outer cylindrical walls. The momentum of these bodies gathered during their movement through the downwardly and forwardly bent tube, causes them to move along upper edge 31 of ridge element 28 and to be guided between plates 12 as shown in FIG. 3A. The generatrix of the cylindrical surface of each body 11 extends, of course, in the direction of the path of travel indicated by the arrow in FIG. 2. While in the position shown in FIG. 3A, each body is supported in a condition of labile equilibrium. When the containers reach diverter means 13, cylinder 16 is actuated to move its piston rod 17 so as to slightly pivot guides 14 about their pivots 15, thereby diverting one or more of the cylindrical bodies into either path 26 or path 27. Rod 17 is held in an extended or retracted position by means of an energized electromagnet or by the use of vacuum means. When it is desired to pivot guides 14, a signal may be given so that either the electromagnet is de-energized or the vacuum lifted, while simultaneously a pneumatic pressure or electromagnetic force is available for shifting rod 17 from a first to a second end position thereof. This shifting occurs only over a distance of a few millimeters which is sufficient to divert the moving cylindrical bodies to one side or the other of ridge element 28. Movement of rod 17 may, of course, be carried out by hand, but will normally take place by means of a signal derived from a sensor (not shown) positioned for example on opposite sides of V-shaped element 29. This sensor would count the passing cylindrical bodies and, as soon as the required number (minus one or two) of the bodies have passed, a signal would issue toward cylinder 16 for changing the position of movable guides 14. Accordingly, the advancing cylindrical bodies would be diverted from their initial path of travel to one or the other sides of plate 29. In such manner it is possible to obtain rows of cylindrical bodies of, for example, 12, 16 or 18 bodies which are further advanced along paths 26 or 27 by means of conveyor belts 32 and 33 toward a loading station as, for example, a continuous sterilizer having carriers capable of taking up a plurality of cylindrical bodies.

The condition of labile equilibrium of cylindrical bodies 11 on ridge element 28 renders it possible to very quickly change the direction of movement thereof into either path 26 or into path 27. This rapid shift capability is needed to permit an efficient diversion of the cylindrical bodies as they move forwardly at a high speed as the bodies emanate, for example, from a filling and closing device. These cylindrical bodies are normally supplied in groups of, for example, ten to twenty to a processing plant such as a continuous sterilizer. There is therefore little time available for shifting such a group of bodies in a transverse direction into a moving carrier of the plant. By dividing the series of bodies supplied into two or more groups, additional time is made available for forming and correctly positioning each group as well as for carrying out the loading operation. This rapid change-over from one path 26 to the other path 27, and vice-versa is essential to a reliable and smooth operation of the plant.

It is also possible that the diversion may be effected by means of a jet of liquid or gas, for example, so as to move bodies 11 from one side to the other of their condition of labile equilibrium on ridge 28. A magnetic force may also be applied for those bodies produced of magnetically-sensitive material.

The present apparatus is, of course, easily adapted for different sizes of bodies 11, the size of tube 10 and the spacing between the various guide plates simply being altered to accommodate such a size.

Obviously, many other modifications and variations are made possible in the light of the above teachings. It is therefore to be understood that within the scope of the appended claims the invention may be practiced otherwise than as specifically described.

What is claimed:

1. Apparatus for diverting a row of cylindrical bodies advancing successively along a path of travel and alternately into two divergent paths of travel, comprising: means for forwardly advancing the bodies in an attitude lying on their respective outer cylindrical walls along the path of travel; spaced, parallel and fixed guide means located adjacent the forward end of said advancing means in the path of travel of the bodies; diverter means located at the forward end of said spaced guide means in the path of travel of the bodies and being movable transversely thereof; a pair of spaced and fixed divergent guide means located adjacent the forward end of said movable guide means and defining the two divergent paths of travel for the bodies; a fixed, narrow upright ridge element located centrally between said fixed guide means and extending toward said divergent guide means; and movable conveyor means located beneath said pair of divergent guide means at a level below the upper edge of said ridge element, the cylindrical bodies moving along said ridge in an unstable condition after leaving said advancing means and thereafter being diverted alternately into the divergent paths of travel upon actuation of said movable diverter means which causes the bodies to move to one side or the other of said ridge element.

2. The apparatus according to claim 1 wherein said diverter means include a pair of spaced guide members pivotally secured to said fixed guide means.

* * * * *